United States Patent
Osswald et al.

(10) Patent No.: US 11,336,108 B2
(45) Date of Patent: May 17, 2022

(54) CHARGING AN ACCUMULATOR

(71) Applicant: Robert Bosch GmbH, Stuttgart (DE)

(72) Inventors: Alexander Osswald, Stuttgart (DE);
Andreas Sedlmayr, Pforzheim (DE);
Christoph Klee, Stuttgart (DE);
Constanze Sorhage,
Leinfelden-Echterdingen (DE); Martin Schmid, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 98 days.

(21) Appl. No.: 16/492,662

(22) PCT Filed: Feb. 21, 2018

(86) PCT No.: PCT/EP2018/054226
§ 371 (c)(1),
(2) Date: Sep. 10, 2019

(87) PCT Pub. No.: WO2018/166768
PCT Pub. Date: Sep. 20, 2018

(65) Prior Publication Data
US 2020/0052497 A1    Feb. 13, 2020

(30) Foreign Application Priority Data
Mar. 14, 2017  (DE) .......................... 102017204149.8

(51) Int. Cl.
*H02J 7/00* (2006.01)
*H01M 10/44* (2006.01)

(52) U.S. Cl.
CPC .......... *H02J 7/007* (2013.01); *H01M 10/443* (2013.01); *H02J 7/00712* (2020.01); *H02J 7/00302* (2020.01); *H02J 7/00308* (2020.01)

(58) Field of Classification Search
CPC ...... H02J 7/007; H02J 7/00712; H02J 7/0029; H02J 7/00302; H02J 7/00308; H01M 10/443
(Continued)

(56) References Cited

U.S. PATENT DOCUMENTS 5,442,274 A * 8/1995 Tamai ................. H02J 7/00711
320/160
5,680,031 A * 10/1997 Pavlovic ............. H02J 7/00711
320/152
(Continued)

FOREIGN PATENT DOCUMENTS

DE    102011107913 A1    1/2013
JP    2001178011 A    6/2001
(Continued)

OTHER PUBLICATIONS

International Search Report for PCT/EP2018/054226, dated Jun. 18, 2018.

*Primary Examiner* — Edward Tso
*Assistant Examiner* — Aaron Piggush
(74) *Attorney, Agent, or Firm* — Norton Rose Fulbright US LLP; Gerard Messina

(57) ABSTRACT

A method is described for charging an accumulator having terminals at which a terminal voltage is applied. The method includes the following steps: (a) charging the accumulator using a predefined current or a predefined electrical power until the terminal voltage has reached a predefined first value; (b) determining a time-dependent drop in the terminal voltage of the accumulator at a reduced charge current; (c) determining a second value on the basis of the voltage loss, the second value being greater than the first value; and (d) charging the accumulator using a predefined current or a
(Continued)

predefined electrical power until the terminal voltage of the accumulator has reached the second value.

14 Claims, 3 Drawing Sheets

(58) Field of Classification Search
USPC ........ 320/139, 141, 145, 153, 157, 160, 162
See application file for complete search history.

(56) References Cited

U.S. PATENT DOCUMENTS

| | | | | |
|---|---|---|---|---|
| 5,998,968 | A * | 12/1999 | Pittman | ................ H02J 7/00711 |
| | | | | 320/130 |
| 8,890,486 | B2 * | 11/2014 | Xiao | .................... H02J 7/00711 |
| | | | | 320/141 |
| 10,291,046 | B2 * | 5/2019 | Ravi | ...................... H02J 7/0069 |
| 10,389,151 | B2 * | 8/2019 | Ravi | ...................... H02J 7/0069 |
| 2006/0208704 | A1 * | 9/2006 | Iwane | ...................... G01R 31/367 |
| | | | | 320/132 |
| 2008/0203969 | A1 * | 8/2008 | Kurihara | ............... H02J 7/0022 |
| | | | | 320/116 |
| 2011/0156660 | A1 * | 6/2011 | Cheng | .................... H02J 7/045 |
| | | | | 320/157 |
| 2017/0104359 | A1 * | 4/2017 | Jung | ....................... H02J 50/10 |

FOREIGN PATENT DOCUMENTS

| | | |
|---|---|---|
| JP | 2004282881 A | 10/2004 |
| JP | 2013115862 A | 6/2013 |
| JP | 2013210257 A | 10/2013 |

* cited by examiner

CHARGING AN ACCUMULATOR

FIELD

The present invention relates to the charging of an accumulator. More specifically, the present invention relates to a technology for the rapid charging of an electrochemical energy store.

BACKGROUND INFORMATION

An accumulator is designed to be charged on the basis of electrochemical processes in order to be able to provide electrical energy. Different technologies such as a lead accumulator or a lithium-ion accumulator may be utilized for this purpose. Generally, the CC/CV (constant current/constant voltage) method is used for the charging. During the charging process, a voltage at terminals of the accumulator is monitored. In a first phase, a constant current is used for the charging until the terminal voltage has reached a predefined value. In a second phase, a constant voltage is then used for the charging until the charge current has dropped below a predefined threshold value.

German Patent Application No. DE 10 2011 107 913 A1 describes the modulation of a charge current of an accumulator and for the determination of the internal resistance of the accumulator from its response. However, the internal resistance of the accumulator may be dependent on the modulation frequency. The charging may therefore be incomplete or may not be carried out at the maximally possible speed.

One object on which the present invention is based is to provide an improved technology for charging an accumulator. Example embodiments of the present invention achieve this objective. Preferred specific embodiments of the present invention are described herein.

SUMMARY

An example method in accordance with the present invention for charging an accumulator including terminals at which a terminal voltage is applied encompasses steps of (a) charging the accumulator using a predefined current or a predefined electrical power until the terminal voltage has reached a predefined first value; (b) determining a time-dependent drop in the terminal voltage of the accumulator at a modified charge current; (c) determining a second value on the basis of the voltage loss, the second value being greater than the first value; and (d) charging the accumulator using a predefined current or a predefined electrical power until the terminal voltage of the accumulator has reached the second value.

For instance, if the accumulator is charged only to an end-of-charge voltage that was indicated and recommended by the manufacturer and then is cut off from the charge current, its terminal voltage drops by a certain amount as a result of electrochemical processes within the accumulator. The extent of this drop is determined by the described method and the charging is continued in such a way that the electrochemical effects are compensated, if possible. After the charging process has been concluded, the accumulator may be fully charged and the charging operation may be approximately 35 to 45% shorter than in a charging operation according to the CC/CV method. The time savings may even be greater under certain circumstances. The accumulator is able to be charged in a conservative manner so that its overall capacitance does not decrease, or decreases only slightly, even across many charging operations. The charging in step (a) may be carried out in the conventional manner so that a time-tested technology that has been recognized as safe may be employed. The determination of the time-dependent drop in step (b) is able to be carried out very rapidly. In one specific embodiment, a time period in the range of only approximately 100 ms to approximately 1.5s is used for this purpose. Because of the individual determination of the time-dependent drop, respective influences on electrochemical processes of the accumulator are able to be taken into account.

For example, ageing or a changed internal resistance of the accumulator may be considered. The further charging of the accumulator in step (d) is able to ensure rapid charging of the accumulator until it reaches its maximum capacitance. Different suggestions for determining the second value in step (c) are made in the following text.

The present method may be employed for any type of accumulator, i.e., any electrochemical energy store. In particular, the present method may advantageously be carried out in connection with a lithium-ion accumulator or a nickel metal hydride accumulator. The accumulator may have one or more cells.

In another preferred specific embodiment, the first value corresponds to an end-of-charge voltage recommended by the manufacturer of the accumulator for the CC/CV charge method. The accumulator may thus be charged in a relatively conservative and rapid manner.

It is preferred that the time-dependent drop of the terminal voltage is determined across a time that is a function of a temperature of the accumulator. With a rising temperature of the accumulator, the electrochemical processes are able to be carried out in an accelerated manner. Hence, the time-dependent drop in the terminal voltage may be greater in a warm accumulator than in a cold accumulator. The time across which the drop in the terminal voltage is observed may be selected correspondingly shorter or longer, depending on whether the accumulator is warmer or colder.

It is particularly preferred that during the determination of the time-dependent drop (in step b), the charge current is modified by a predefined fraction of the charge current flowing before the first value is reached. For example, the charge current in step b may be reduced by approximately 10% to 20% or by approximately 50% in comparison with step (a). In a further specific embodiment, the charge current may also be reduced to zero during the determination. In a still further specific embodiment, the charge current may also be increased.

In one preferred embodiment, the second value is determined using a $2^{nd}$ order polynomial from the time-dependent drop. Constants of the polynomial are able to be determined in an empirical manner, for example. A higher polynomial order, in particular the third order, is possible as well.

In one further variant of the present method, the second value is determined as a function of a temperature of the accumulator. A rising temperature of the accumulator is usually also accompanied by a rise in the terminal voltage during a no-load operation. This effect is able to be taken into account by considering the accumulator temperature, so that the accumulator is able to be fully charged regardless of its temperature.

In further specific embodiments, additional physical parameters may also be taken into consideration, such as the time-dependent voltage drop of the terminal voltage, an internal pressure of the cell, a geometrical extension of an electrode or of both electrodes of the accumulator, the potential of the cathode of the accumulator, or the potential of the anode of the accumulator.

It is generally preferred that the charge current flowing in step (d) is lower than the charge current flowing in step (a). In addition, the charge current flowing in step (d) is able to be determined as a function of a temperature of the accumulator.

The charging in step (d) is preferably terminated if a rise in the terminal voltage exceeds a predefined threshold value. This avoids overcharging of the accumulator, which could cause it to burst or to go up in flames. The safety of the charging method is thereby able to be further improved.

In a still further specific embodiment, the charging in step (d) is terminated if a rise in the temperature of the accumulator exceeds a predefined threshold value. This measure, too, may safeguard the accumulator in connection with the charging.

In a still further specific embodiment, the following steps are subsequently carried out: Terminating the charging of the accumulator; determining that the terminal voltage undershoots a predefined value; and charging the accumulator using a predefined charge voltage. The predefined charge voltage may particularly correspond to the predefined value. The predefined value may especially also encompass an end-of-charge voltage recommended by the manufacturer of the accumulator. Because of the additionally executed steps, an unutilized capacitance of the accumulator, which was used for safety margins, for compensating for a measuring uncertainty or an imprecision of a used mathematical model, for example, is able to be exploited. This allows for a further increase in the energy stored in the accumulator.

In accordance with the present invention, a computer program product is provided which includes program code intended for carrying out the afore-described method when the computer program product is running on a processing unit or is stored on a computer-readable data carrier.

In accordance with the present invention, a device is provided for charging an accumulator having terminals at which a terminal voltage is applied includes a controllable current source, which is developed to supply a predefined voltage or a predefined electrical power at the terminals; a sampling device for determining the terminal voltage; and a control unit. The control unit is developed to control a charging operation of the accumulator with the aid of the current source until the terminal voltage has reached a predefined first value; to determine a time-dependent drop in the terminal voltage of the accumulator at a modified charge current; to determine a second value on the basis of the voltage loss, the second value being greater than the first value; and to control a charging operation of the accumulator using the current source until the terminal voltage of the accumulator has exceeded the second value.

The device may be set up as a charging device, in particular. The control unit may include a processing device, which particularly may be developed as a programmable microcomputer or a microcontroller. The processing unit is preferably developed to fully or partially carry out the afore-described method.

Features or advantages of the present method may therefore be transferable to the device and vice versa.

In one further specific embodiment, the device also includes a further sampling device for determining a temperature of the accumulator. In this manner, the variants previously mentioned in connection with the present method, which use a temperature of the accumulator, are able to be executed with the aid of the control unit or its processing device.

BRIEF DESCRIPTION OF EXAMPLE EMBODIMENTS

The present invention is described in greater detail below with reference to the figures.

DETAILED DESCRIPTION OF EXAMPLE EMBODIMENTS

Figure 1:
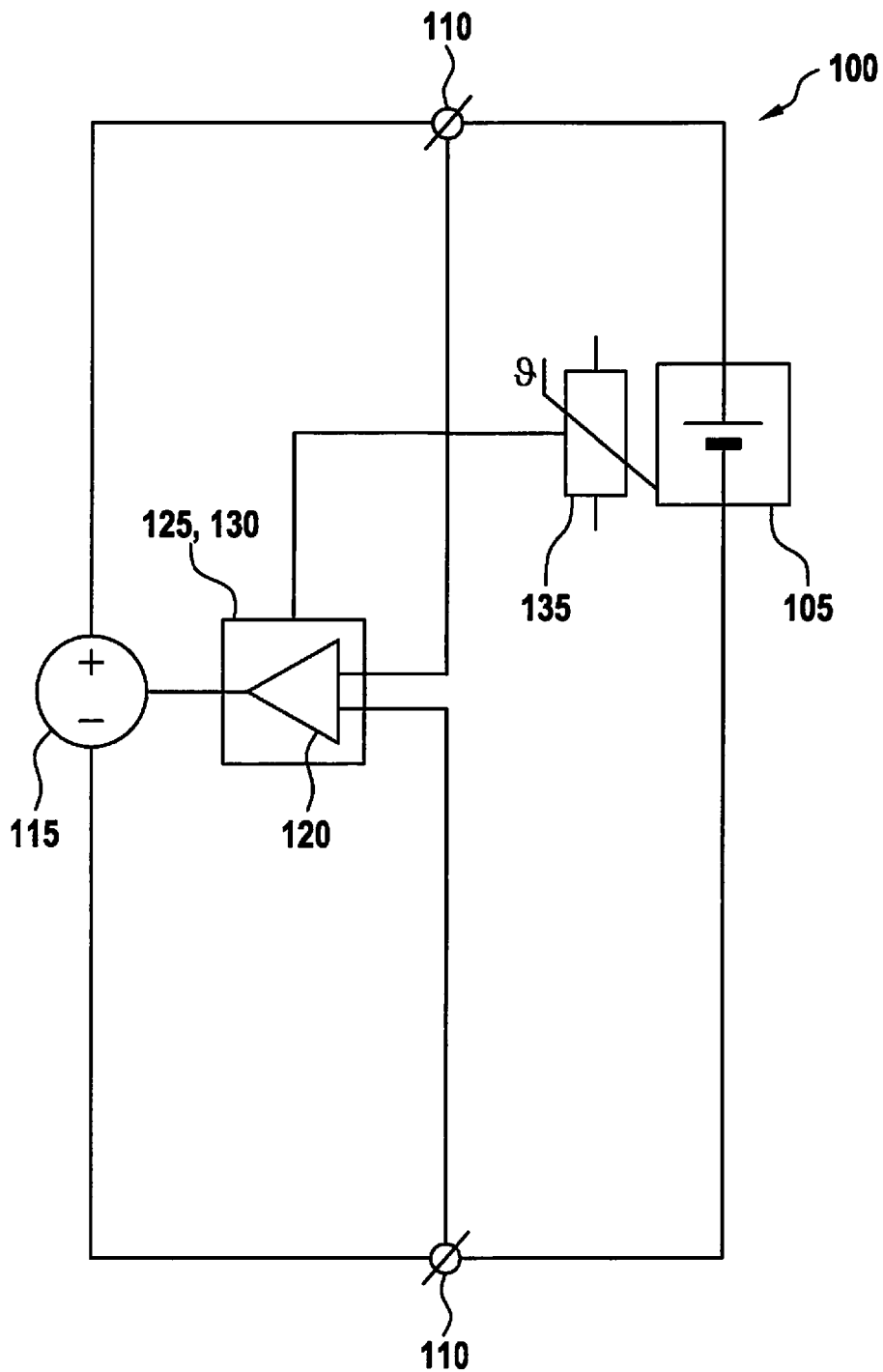
FIG. 1 shows a schematic circuit diagram of a charge device for an accumulator.

FIG. 1 shows a schematized circuit diagram of a charging device 100 for an accumulator 105. Accumulator 105 may have one or more cells that operate according to the same electrochemical principle. Accumulator 105 includes at least two terminals 110 between which a terminal voltage of accumulator 105 is applied. Energy between accumulator 105 and charging device 100 or a consumer (not shown) generally occurs by a current through terminals 110. A terminal voltage is applied between the two terminals 110.

Charging device 100 includes a controllable current source 115, which is developed to induce either a constant voltage or a constant current at or through terminals 110. Current source 115 may be set up to control only one or both, alternatively the one or the other parameter. In addition, charging device 100 includes a sampling device 120, which is set up to determine the terminal voltage at terminals 110 or a time-dependent drop in the terminal voltage. In addition, a control unit 125 is provided, which may include a processing device 130. Control unit 125 is set up to control the current supplied by current source 115 or the electric power supplied by current source 115 as a function of the terminal voltage or possibly as a function of still further parameters. The control may additionally be controlled in particular as a function of a temperature of accumulator 105. Toward this end, a further sampling device 135 in the form of a temperature sensor may be provided, sampling device 135 preferably being placed in close proximity to accumulator 105 or one of its cells. In one embodiment, sampling device 135 is developed in an integrated fashion with accumulator 105. A further interface may then be provided between sampling device 135 and control unit 125.

Figure 2:
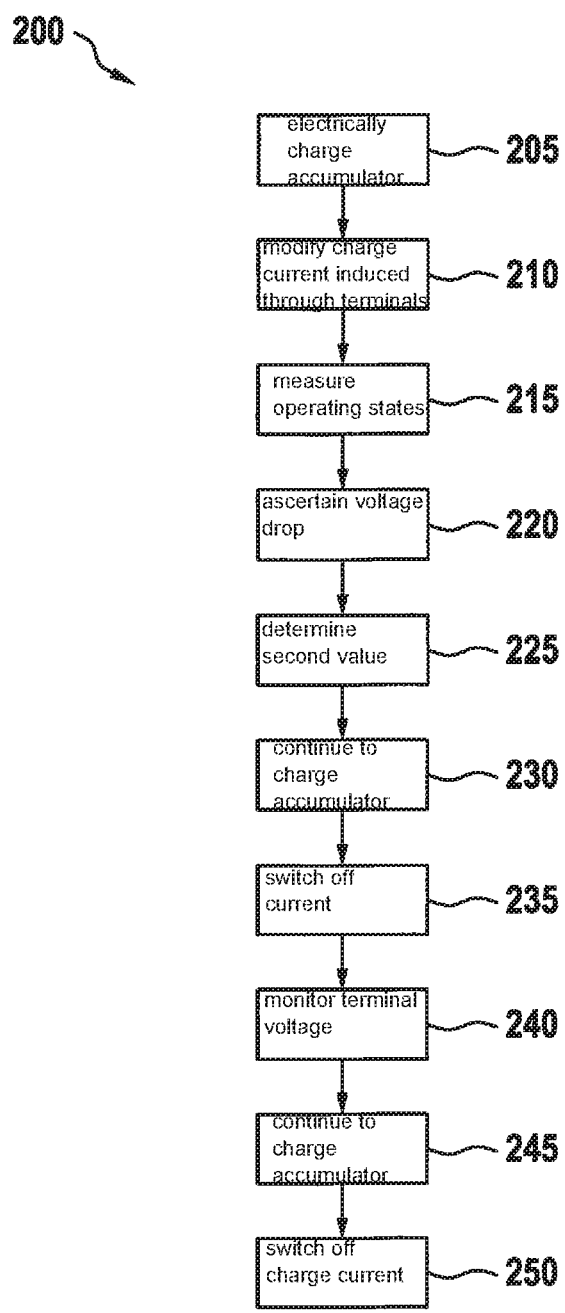
FIG. 2 shows a flow diagram of a method for charging an accumulator.

FIG. 2 shows a flow diagram of a method for charging an accumulator 105. Method 200 may be carried out with the aid of control unit 125 or its processing device 130, in particular. More specifically, method 200 may be provided in the form of a computer program product for this purpose. Individual steps of method 200 are able to be carried out in different variants so that a large variety of possible combinations results. The individual variants are described in greater detail in the following text with reference to the respective steps. One skilled in the art will appropriately combine the individual variants or options in order to set up a method 200 that satisfies the respective requirements.

In a step 205, accumulator 105 is electrically charged. To do so, a predefined constant current or a predefined constant power through accumulator 105 is alternatively controllable. The charge current or charge power may particularly comply with a specification by the manufacturer of accumulator 105. Such recommendations are available for practically all known accumulators 105. The charging is able to be performed until the terminal voltage has reached a predefined first value. This first value, for instance, may be predefined by the manufacturer of the accumulator as an end-of-charge voltage, e.g., 4.2V. However, it is also possible to use a modified end-of-charge voltage and especially an end-of-charge voltage that is reduced in comparison with this recommendation, such as approximately 4.1V. If the terminal voltage reaches the modified end-of-charge voltage, accumulator 105 may subsequently continue to be charged using a predefined current until the terminal voltage has reached the predefined first value. The charge current may once again follow a recommendation by the manufacturer of accumulator 105.

In a step 210, the charge current induced through terminals 110 is modified. For example, the current may be reduced such as by approximately 40% to 60%, and furthermore preferred, by approximately 50%. In another specific embodiment, however, the current may also be increased, e.g., by approximately 5% to 20% and furthermore preferred, by approximately 10%. In one further embodiment, it is also possible that the current is reduced by 100% and thus is lowered to zero.

The terminal voltage at the beginning of second step 210 is known. Following a predefined pause, which, for example, may lie in the range of a few 10 ms to a few 100 ms, such as approximately 150 ms, the terminal voltage of accumulator 105 is sampled once again. The time between the modification of the charge current and the renewed sampling of the terminal voltage is able to be determined as a function of the temperature of accumulator 105. The temperature is preferably determined with the aid of sampling device 135. The wait time is denoted by $t_1$ in this instance. The terminal voltage following the wait time is denoted by $U(t_1)$.

In a fourth step 220, a voltage drop is ascertained on the basis of the two voltages:

$$\Delta U_{Ri} = U_{end-of-charge} - U(t_1) \quad \text{(equation 1)}$$

The voltage drop is an auxiliary variable, which usually correlates with an Ohmic internal resistance of accumulator 105.

In a fifth step 225, a second value $U_0$ is determined to which accumulator 105 is subsequently meant to be charged. The determination is carried out on the basis of the voltage drop from equation 1 and, for instance, is able to be determined in a polynomial manner in the following way:

$$U_0(\Delta U_{Ri}) = 16.78 \cdot \Delta U_{Ri}^2 - 2.80 \cdot \Delta U_{Ri} + 4.55V \quad \text{(equation 2)}$$

For instance, the constants used for this purpose may be empirically determined with regard to an accumulator 105 or a type of accumulator 105. The indicated formula uses exemplary, rounded constants. The determined second value is able to be checked for plausibility and in particular be restricted to a predefined maximum value.

In one further specific embodiment, second value $U_0$ is able to be determined while taking the temperature of accumulator 105 into account, such as in the following exemplary equation:

$$U_0(\Delta U_{Ri}) = 16.78 \cdot \Delta U_{Ri}^2 - 2.80 \cdot \Delta U_{Ri} + 4.55 - |(T_c - 23° \text{C.})| \cdot 0.001V \quad \text{(equation 3)}$$

In one further specific embodiment, it is also possible to choose a polynomial of a higher order, e.g., the third or fourth order. In addition, second value $U_0$ may also be determined in some other manner on the basis of the voltage drop from formula 1. A mathematical model is able to be used for this purpose, in which different physical parameters may be used such as the afore-described voltage drop, the temperature of accumulator 105, the internal pressure of accumulator 105, the geometrical extension of one or both electrodes of accumulator 105, the potential of the cathode or the potential of the anode of accumulator 105.

In a sixth step 230, accumulator 105 continues to be charged until its terminal voltage corresponds to the second value determined in step 225. Toward this end, the same current as above in step 1 or a lower current through accumulator 105 may be induced. In one further variant, the temperature of accumulator 105 is detected and the charge current is determined as a function of the temperature. For instance, the following charge current may be used:

$$I = I_{max} - k1 \cdot |(Tz - 23° \text{C.})| - k2 \cdot (U_0 - 5.25V) \quad \text{(equation 4)}$$

where $I_{max}$ the predefined charge current, in particular according to the recommendation by the manufacturer of accumulator 105;

$U_0$ second value (second end-of-charge voltage) determined in step 225;

Tz temperature of accumulator 105;

k1 correction factor 1, e.g., $I_{max} * 0.01 * 1/° \text{C.}$ k2 correction factor 2, e.g., $I_{max} * 0.05 * 1/0.01V$.

The further constants mentioned in equation 4 represent approximate values of the examples mentioned above. These constants may particularly be determined empirically.

During the further charging of accumulator 105 in sixth step 230, the terminal voltage may be monitored on a continuous basis. In particular, it may be determined how quickly the terminal voltage is rising over time. If this rate exceeds a predefined threshold value, then the charging in step 230 may be terminated.

In one further specific embodiment, it is also possible to monitor the temperature of accumulator 105. The temperature of accumulator 105 usually rises because of the charging operation. If the rate of the temperature rise of accumulator 105 exceeds a predefined threshold value, then the charging in step 230 may also be terminated.

In a seventh step 235, the current flowing through accumulator 105 is able to be switched off. In addition, the end of the charging operation may be signaled, for instance to a user or to some other control unit. The signal may be of a logical, acoustic, optical or haptic nature.

Optionally, the terminal voltage of accumulator 105 continues to be monitored in an eighth step 240 after the charge current has been switched off. If the terminal voltage drops below a predefined value, which may correspond to an end-of-charge voltage of accumulator 105, in particular, then the accumulator may continue to be charged in a ninth step 245 using a constant voltage. The constant voltage may especially correspond to the end-of-charge voltage used in step 240. This offers the advantage that a capacitance of accumulator 105 may be exploited that is otherwise not available, for instance because of safety margins, a measuring uncertainty or an uncertainty in a used mathematical model.

In a tenth step 250, the charge current may be switched off once a predefined charging duration is reached or once the charge current flowing through accumulator 105 has reached a predefined value.

If actuator 105 includes more than one cell, then operating states for each individual cell are able to be measured in third step 215. In second step 210, the current is preferably switched off for entire accumulator 105. In fifth step 225, the second value is calculated, preferably with regard to each individual cell. In seventh step 235, the charging may be terminated as soon as the first cell has reached its individual switch-off criterion.

Figure 3:
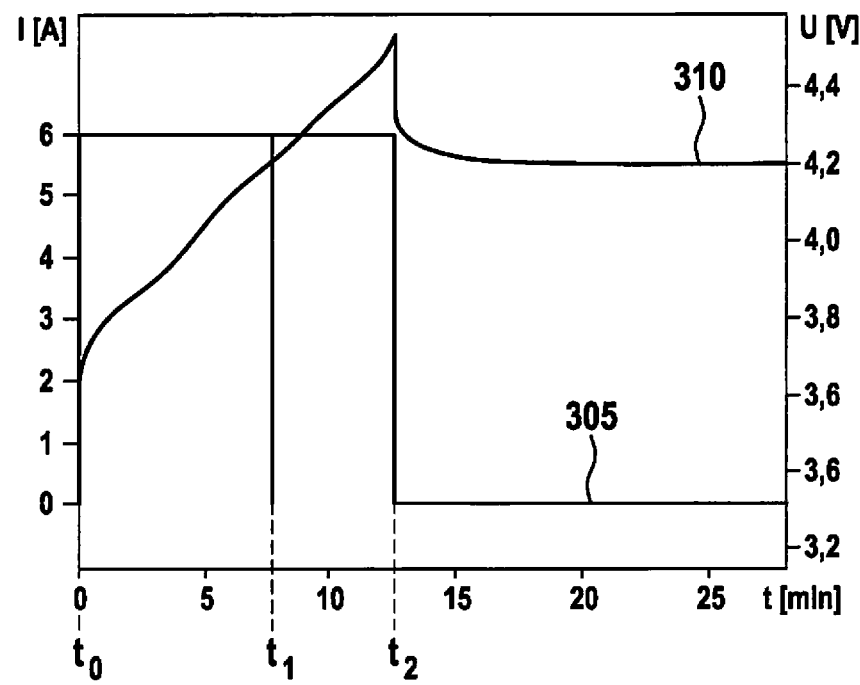
FIG. 3 shows an exemplary charge characteristic of an accumulator.

FIG. 3 shows an exemplary charge characteristic of an accumulator 105 during a charging operation using a method 200 according to FIG. 2. The illustrated characteristics and numerical values should be understood as examples. In the horizontal direction, a time is indicated in minutes. In the vertical direction, a charge current and a terminal voltage are entered. A first characteristic 305 relates to the charge current and a second characteristic 310 relates to the terminal voltage.

Starting at an instant $t_0$, accumulator 105 is charged using a constant charge current. In the process, its terminal voltage rises in an essentially linear manner at least in a predefined range. At an instant $t_1$, the terminal voltage reaches a predefined first value. The charge current is temporarily switched off or modified in some other manner, and the change in the terminal voltage in response to the change in the charge current is determined. This process corresponds to steps 210 through 225 of afore-described method 200.

Accumulator 105 is subsequently charged further (compare step 230) until the terminal voltage has reached the previously determined second value at an instant $t_2$.

When the charge current is switched off, the terminal voltage ideally drops to a predefined value that characterizes the maximum utilization of the capacitance of accumulator 105.

Figure 4:
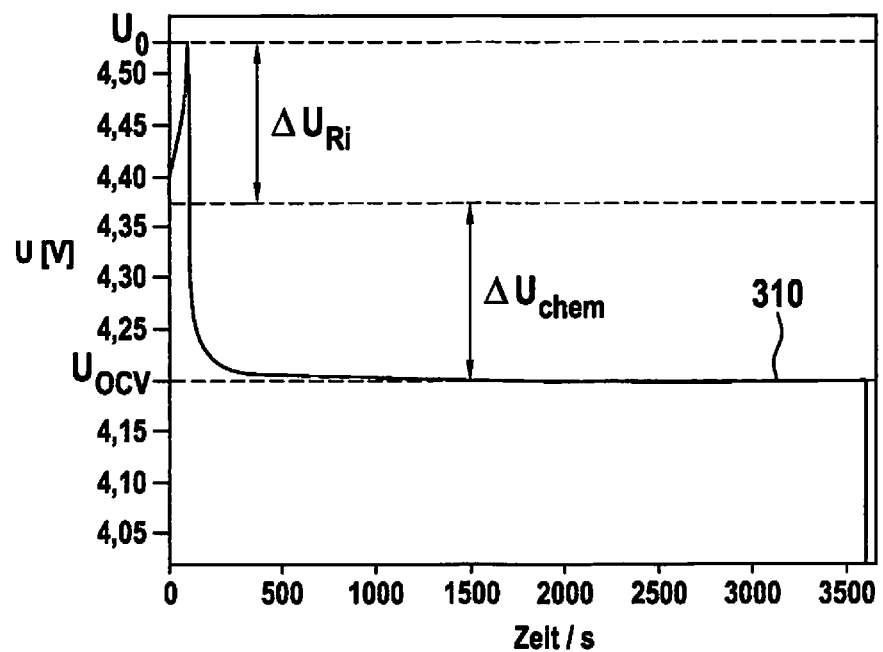
FIG. 4 shows a voltage characteristic at an accumulator.

FIG. 4 shows an exemplary voltage characteristic at an accumulator 105. A terminal voltage has been plotted in the vertical direction, and a time has been entered in the horizontal direction. The illustrated process is shown in FIG. 3 in a range from briefly before instant $t_2$ to the end of the diagram.

Illustrated characteristic 310 of the terminal voltage gives an impression of the behavior of an exemplary accumulator 105. The drop in the terminal voltage is made up of an Ohmic voltage drop $\Delta U_{Ri}$ and a chemical voltage drop $\Delta U_{chem}$.

What is claimed is:

1. A method for charging an accumulator having terminals at which a terminal voltage is applied, the method comprising the following steps:
   a. charging the accumulator, using a predefined current or a predefined electrical power, until the terminal voltage has reached a predefined first value;
   b. determining a time-dependent drop in the terminal voltage of the accumulator at a modified charge current;
   c. determining a second value based on a voltage loss, the second value being greater than the first value; and
   d. charging the accumulator, using a predefined current or a predefined electrical power, until the terminal voltage of the accumulator has reached the second value,
   wherein during the determination of the time-dependent drop, the charge current is reduced to a non-zero value which is a predefined fraction of up to approximately 50% of the charge current flowing before the first value was reached.

2. The method as recited in claim 1, wherein the first value corresponds to an end-of-charge voltage for a CC/CV charge method recommended by a manufacturer of the accumulator.

3. The method as recited in claim 1, wherein the time-dependent drop in the terminal voltage over a time is determined, which is a function of a temperature of the accumulator.

4. The method as recited in claim 1, wherein the second value is determined using a second order polynomial from the time-dependent drop.

5. The method as recited in claim 1, wherein the second value is determined as a function of a temperature of the accumulator.

6. The method as recited in claim 1, wherein the charge current flowing in step d. is lower than the charge current flowing in step a.

7. The method as recited in claim 1, wherein the charge current flowing in step d. is determined as a function of a temperature of the accumulator.

8. The method as recited in claim 1, wherein the charging in step d. is terminated when a rise in the terminal voltage exceeds a predefined threshold value.

9. The method as recited in claim 1, wherein the charging in step d. terminated when a rise in a temperature of the accumulator exceeds a predefined threshold value.

10. The method as recited in claim 1, further comprising the following steps:
    terminating the charging of the accumulator;
    determining that the terminal voltage undershoots a predefined value; and
    charging the accumulator using a charge voltage of the predefined value.

11. A computer-readable data carrier on which is stored a computer program having program code for charging an accumulator having terminals at which a terminal voltage is applied, the computer program, when executed on a processing device, causing the processing device to perform the following steps:
    a. charging the accumulator, using a predefined current or a predefined electrical power, until the terminal voltage has reached a predefined first value;
    b. determining a time-dependent drop in the terminal voltage of the accumulator at a modified charge current;
    c. determining a second value based on a voltage loss, the second value being greater than the first value; and
    d. charging the accumulator, using a predefined current or a predefined electrical power, until the terminal voltage of the accumulator has reached the second value,
    wherein during the determination of the time-dependent drop, the charge current is reduced to a non-zero value which is a predefined fraction of up to approximately 50% of the charge current flowing before the first value was reached.

12. A device for charging an accumulator having terminals at which a terminal voltage is applied, the device comprising:
    a controllable current source which is configured to supply, at the terminals, a predefined voltage or a predefined electrical power;
    a sampling device configured to determine the terminal voltage; and
    a control unit configured to:
        control charging of the accumulator using the current source until the terminal voltage has reached a predefined first value;
        determine a time-dependent drop in the terminal voltage of the accumulator at a modified charge current;
        determine a second value based on a voltage loss, the second value being greater than the first value; and
        control the charging of the accumulator using the current source until the terminal voltage of the accumulator has reached the second value, wherein during the determination of the time-dependent drop, the charge current is reduced to a non-zero value which is a predefined fraction of up to approximately 50% the charge current flowing before the first value was reached.

13. The device as recited in claim 12, further comprising:
a further sampling device configured to determine a temperature of the accumulator.

14. A method for charging an accumulator having terminals at which a terminal voltage is applied, the method comprising the following steps:
   a. charging the accumulator, using a predefined current or a predefined electrical power, until the terminal voltage has reached a predefined first value;
   b. determining a time-dependent drop in the terminal voltage of the accumulator at a modified charge current;
   c. determining a second value of the terminal voltage based on a voltage loss, the second value being greater than the first value by more than the time-dependent drop in the terminal voltage; and
   d. charging the accumulator, using a predefined current or a predefined electrical power, until the terminal voltage of the accumulator has reached the second value,
   wherein during the determination of the time-dependent drop, the charge current is reduced to a non-zero value which is a predefined fraction of up to approximately 50% of the charge current flowing before the first value was reached.

* * * * *